United States Patent
Norell et al.

[11] Patent Number: 6,069,432
[45] Date of Patent: May 30, 2000

[54] ROTOR STRUCTURE

[75] Inventors: Neil N. Norell, Apalachin, N.Y.; Mark E. Baer, Williamsport, Pa.

[73] Assignee: Shop Vac Corporation, Williamsport, Pa.

[21] Appl. No.: 09/182,544

[22] Filed: Oct. 29, 1998

[51] Int. Cl.[7] ....................................................... H02K 1/22
[52] U.S. Cl. ............................................. 310/261; 310/91
[58] Field of Search ................................. 310/67 R, 43, 310/217, 261, 90, 91, 239; 29/596, 598; 384/297–300, 907–911, 291–292

[56] References Cited

U.S. PATENT DOCUMENTS

| 3,662,200 | 5/1972 | Rank et al. | 310/211 |
| 4,564,781 | 1/1986 | Arnegger | 310/261 |
| 4,760,301 | 7/1988 | Iizima et al. | 310/233 |
| 5,685,648 | 11/1997 | Harris et al. | 384/291 |
| 5,762,424 | 6/1998 | Harris et al. | 384/299 |

*Primary Examiner*—Nestor Ramirez
*Assistant Examiner*—Tran N Nguyen
*Attorney, Agent, or Firm*—Marshall, O'Toole, Gerstein, Murray & Borun

[57] ABSTRACT

A rotor structure includes a rotor shaft and a sleeve of electrically nonconductive material surrounding an outer surface of the shaft. The sleeve includes an inner surface having an interfering portion of angular extent substantially less than an entire angular extent of the inner surface. The interfering portion has an interfering relationship with the outer surface of the shaft and a rotor body is carried by the sleeve.

14 Claims, 4 Drawing Sheets

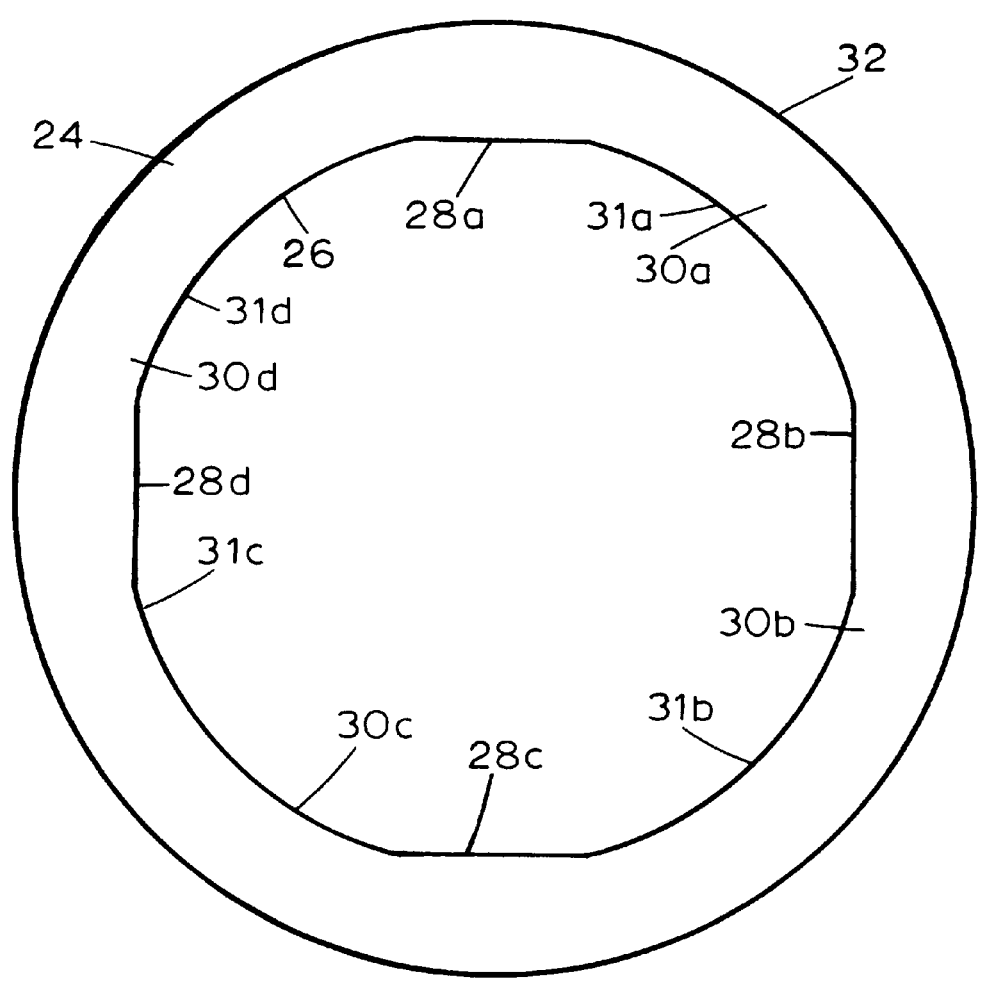

6,069,432

ROTOR STRUCTURE

TECHNICAL FIELD

The present invention relates generally to rotary bodies, and more particularly to a rotor structure for a rotary machine.

BACKGROUND ART

There are a number of different ways to assemble a rotary structure, such as a dynamoelectric machine rotor. For example, in a single or double insulated motor, it may be necessary to place an electrically insulative member between a rotor shaft and a rotary body mounted thereon comprising a stack of laminations. FIGS. 6A and 6B illustrate a prior art fiberglass sleeve 2 having an inner surface 4 and an outer surface 6. The fiberglass sleeve 2 has been utilized having an outer diameter which is slightly less than an inner diameter of a bore extending through the stack. After the sleeve 2 is placed in a bore, a metal rotor shaft having an outer diameter slightly greater than the inner diameter of the fiberglass sleeve 2 is forced into the fiberglass sleeve 2, causing the fiberglass sleeve 2 to expand radially outwardly into contact with the walls defining the bore. The dimensions of the various parts are selected such that the laminations are trapped on the outside of the sleeve 2 and thereby fixed in position.

While the foregoing assembly has been effective to securely assemble the various parts together, it has been found that relatively high assembly pressures must be utilized to insert the metal shaft into the fiberglass sleeve 2. These assembly pressures can cause the shaft to bend or flare out undesirably on the end that is pressed.

SUMMARY OF THE INVENTION

A rotor structure eliminates the drawbacks noted above in a simple and effective manner.

More particulary, in accordance with one aspect of the present invention, a rotor structure includes a rotor shaft having an outer surface and a sleeve of an electrically conductive material surrounding the outer surface of the shaft. The sleeve includes an inner surface having an interfering portion of angular extent substantially less than an angular extent of the inner surface and the interfering portion has an interfering relationship with the outer surface of the shaft. In addition, a rotor body is carried by the sleeve.

Preferably, the sleeve is fabricated of fiberglass. Also preferably, the inner surface further includes three additional interfering portions spaced from each other and spaced from the first-named interfering portion.

Still further in accordance with the preferred embodiment, the interfering portions are equally spaced from one another and are separated by curved wall portions. The curved wall portions may have a common inside radius and the shaft outer surface may have an outer radius less than the common inside radius. Still further, the interfering portions may comprise flat surfaces.

In accordance with another aspect of the present invention, a rotor for a motor includes a rotor shaft having an outer surface and sleeve of an electrically nonconductive material surrounding the outer surface of the shaft and having an inner surface. The inner surface has a plurality of interfering portions each of angular extent substantially less than an entire angular extent of the inner surface and the interfering portions have an interfering relationship with the outer surface of the shaft to fix the sleeve on the shaft. A series of rotor laminations are carried by the sleeve.

Other features and advantages will become apparent from the specification and drawings of the present application, in which like reference numerals denote like structures.

BRIEF DESCRIPTION OF THE DRAWINGS

FIG. 2 is a side elevational view of a sleeve forming a part of the present invention;

FIG. 3 is an end elevational view of the sleeve of FIG. 2;

DESCRIPTION OF THE PREFERRED EMBODIMENTS

Figure 1:
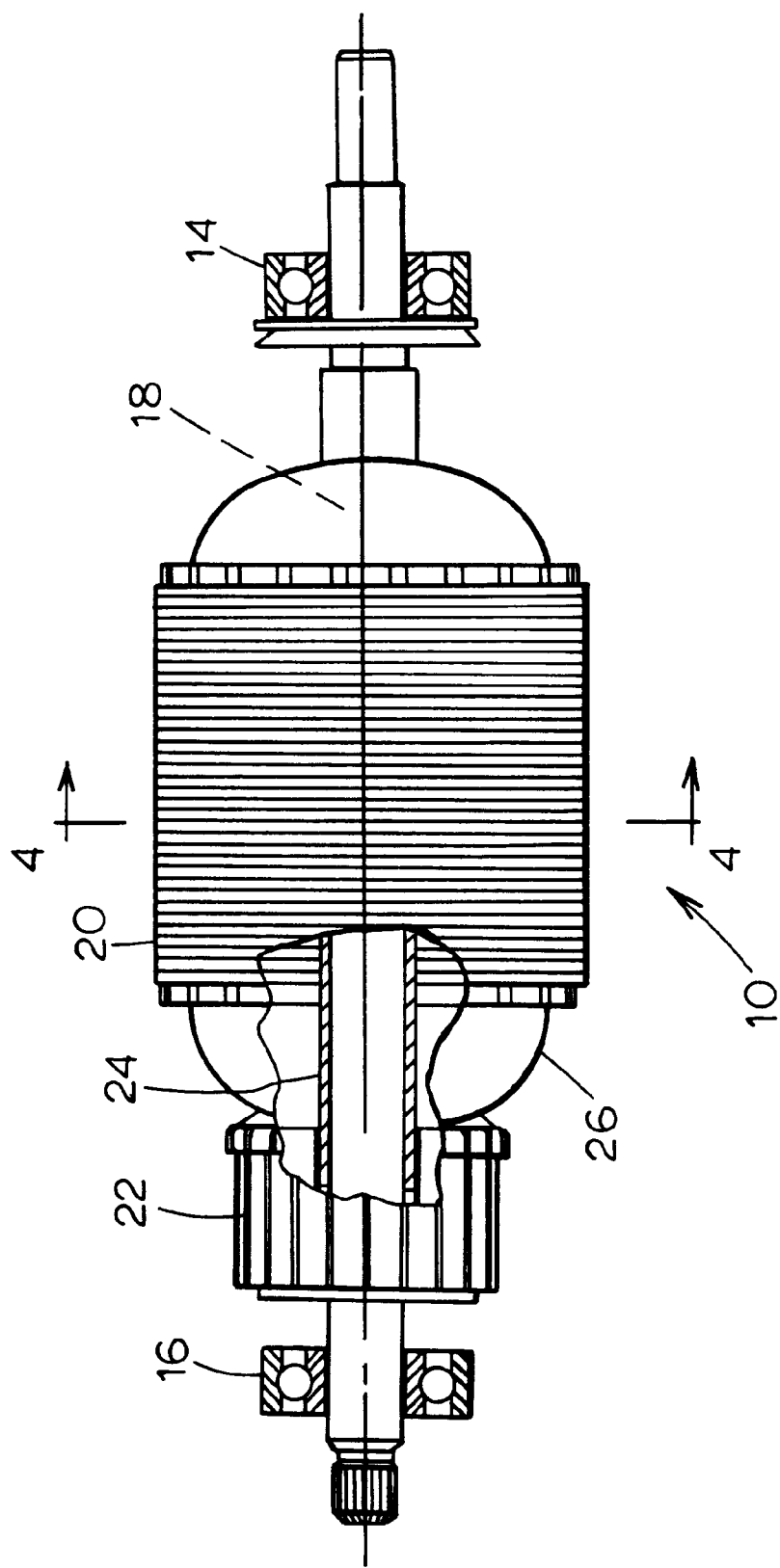
FIG. 1 is a side elevational view, with portions broken away, of a rotor structure according to the present invention.

Referring now to FIG. 1, a rotor structure 10 which may comprise, for example, a rotor for an electromagnetic machine, such as a double insulated motor, includes a rotary shaft 12 mounted in bearings 14, 16 for rotation about a center axis 18. It should be noted that the rotor structure may be usable in any one of a number of different environments, as desired, such as a shingle insulated motor, a generator, etc. The rotor structure 10 further includes a lamination stack 20 comprising a series of laminations made of magnetically permeable material. A commutator 22 is mounted adjacent the lamination stack 20 on the shaft 12. A sleeve 24, preferably fabricated of fiberglass, is mounted on the shaft 12. In addition, windings 26 extend through slots in the lamination stack 20 and are electrically connected to the commutator 22.

FIGS. 2 and 3 illustrate the sleeve 24 in greater detail. The sleeve 24 includes an inner surface 26 having at least one, and preferably a plurality of interfering portions 28. In the preferred embodiment, there are four interfering portions 28a–28d, although a different number of interfering portions could alternatively be provided. Also in the preferred embodiment, the interfering portions 28a–28d comprise flat surfaces which are equally spaced and separated from one another by curved wall portions 30a–30d. Still further in accordance with the preferred embodiment, inner surfaces of 31a–31d of the curved wall portions 30a–30d lie on a common inside radius and the flat surfaces 28a–28d lie inside the common inside radius.

Figure 4:
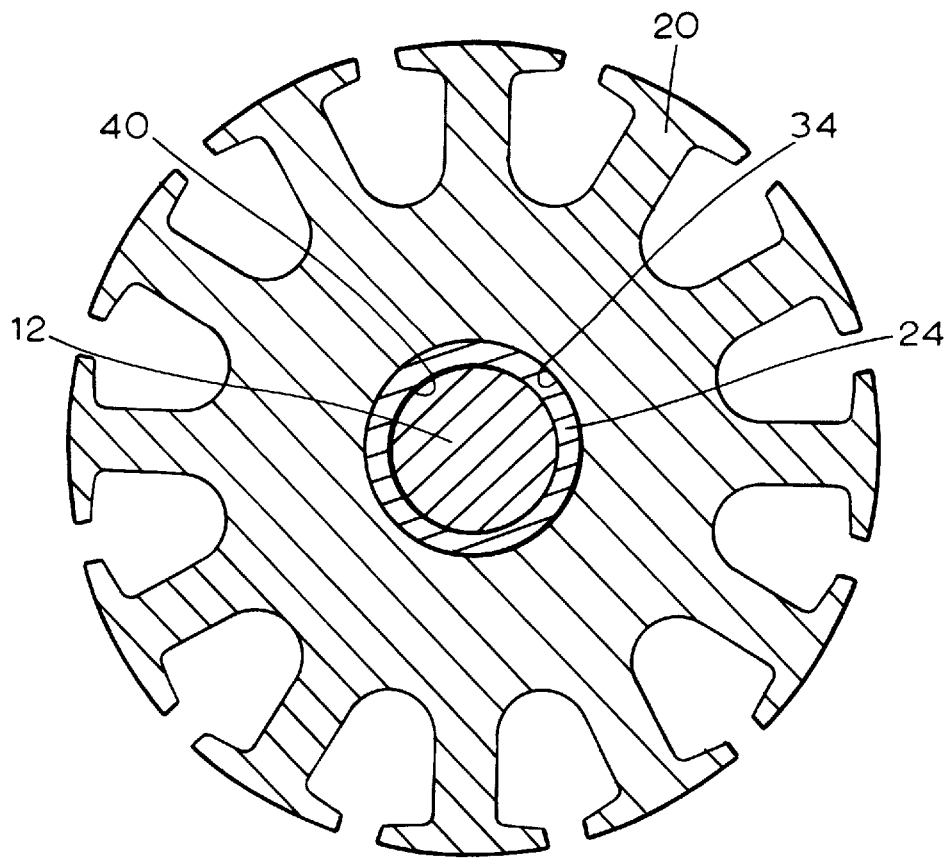
FIG. 4 is a cross-sectional view taken generally at the lines 4—4 of FIG. 1 showing the rotor structure without windings therein.
Figure 5:
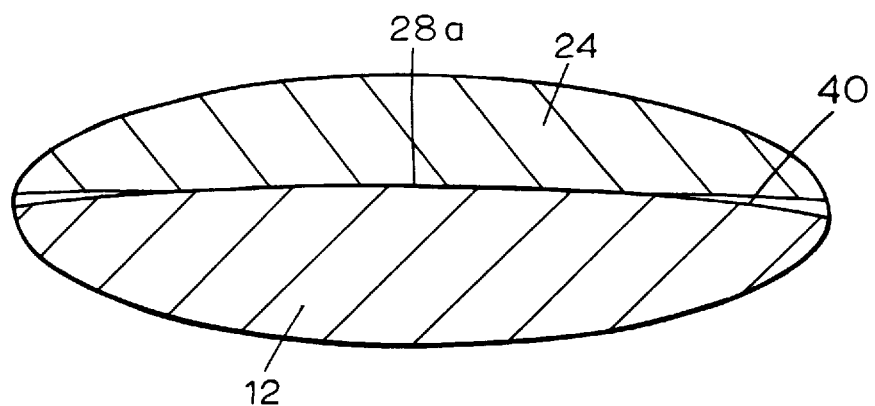
FIG. 5 is a fragmentary enlarged view of a portion of the rotor structure of FIG. 4 illustrating the shaft and sleeve in greater detail.
Figure 6A:
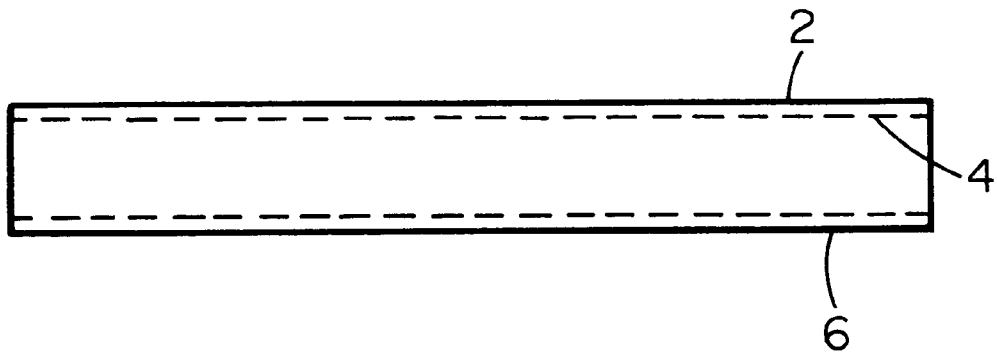
FIG. 6A is a cross-sectional view of a prior art fiberglass sleeve.
Figure 6B:
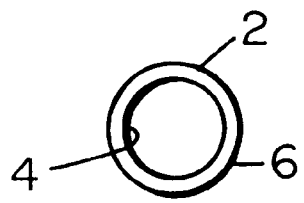
FIG. 6B is a side elevational view of the sleeve shown in FIG. 6A.

The sleeve 24 also includes an outer surface 32 which, in the preferred embodiment, is substantially circular cylindrical in shape. An outer diameter of the outer surface 32 is preferably slightly less than an inner diameter 34 (FIG. 4) of the aligned bores of the lamination stack 20. During assembly, the central bores and winding slots of the laminations forming the stack 20 are aligned and the sleeve 24 is inserted into the aligned bores. Preferably, the outer diameter of the sleeve 24 is sufficiently close to the inner diameter 34 of the lamination stack 20 so that the lamination stack 20 is loosely held in place on the sleeve 24 at the desired location. Thereafter, the shaft 12 is pressed into the sleeve until the shaft 12 is located at the desired position therein. FIG. 5 illustrates the deformation of the sleeve 24 after the shaft 12 has been inserted therein whereby compressed fiberglass material in the vicinity of one of the flat surfaces (for example, the flat surface 28a) flows into voids between the curved wall portions 30 and an outer surface 40 of the shaft 12. Preferably, the distance between opposing flat surfaces 28a, 28c, 28b and 28d is somewhat less than the outer diameter of the shaft 12 to obtain this deformation of the material of the sleeve 24. Further, the difference between the outer diameter of the shaft 12 and the distance between opposed flat surfaces 28 is also selected to cause the sleeve 24 to expand radially outward into tight contact with the lamination stack 20 to thereby fix the position of the lamination stack 20 relative to the sleeve 24 and the shaft 12. The foregoing can be accomplished and still allow assembly pressures to be reduced thereby preventing damage to the shaft 12.

The present invention permits the stack 20 to be mounted on the shaft 12 securely, while at the same time providing an insulative member therebetween. If necessary or desirable, electrically nonconductive insulative material may also be placed in each of the slots to further insulate the electrical windings from the shaft 12.

If desired, the sleeve could be fabricated of a different suitable material and/or the shape of the sleeve and/or the bores of the lamination stack 20 and/or the shaft 12 could be modified. Also, the interfering portions 28a–28d may have different shapes other than flat surfaces, as desired.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights of all modifications which come within the scope of the appended claims are reserved.

What is claimed is:

1. A rotor structure, comprising:

a rotor shaft having an outer surface;

a rotor body surrounding the shaft and having a bore therethrough; and a sleeve of an electrically nonconductive material disposed between the outer surface of the shaft and the bore of the rotor body, the sleeve having an outer surface and an inner surface and having an outer diameter slightly less than a diameter of the bore and an inner diameter slightly greater than a diameter of the shaft, wherein the inner surface has a first interfering portion of circumferential extent substantially less than an entire circumferential extent of the inner surface and wherein the first interfering portion is dimensioned to have an interfering relationship with the outer surface of the shaft so that at least some of the sleeve material associated with the first interfering portion is compressed to flow into voids between the inner surface of the sleeve and the outer surface of the rotor shaft.

2. The rotor structure of claim 1, wherein the sleeve is fabricated of fiberglass.

3. The rotor structure of claim 1, wherein the inner surface further includes second, third and fourth interfering portions spaced from each other and spaced from the first interfering portion.

4. The rotor structure of claim 3, wherein the first, second, third and fourth interfering portions are equally spaced from one another and are separated by curved wall portions.

5. The rotor structure of claim 4, wherein the curved wall portions have a common inside radius.

6. The rotor structure of claim 5, wherein the shaft outer surface has an outer radius less than the common inside radius.

7. The rotor structure of claim 4, wherein the first, second, third and fourth interfering portions comprise flat surfaces that each face the outer surface of the rotor shaft.

8. A rotor for a motor, comprising:

a rotor shaft having an outer surface;

a series of rotor laminations surrounding the shaft and having bores therethrough; and a sleeve of an electrically nonconductive material disposed between the outer surface of the shaft and the bores of the rotor laminations, the sleeve having an outer surface and an inner surface and having an outer diameter slightly less than a diameter of th bores and an inner diameter slightly greater than a diameter of the shaft, wherein the inner surface has a first interfering portion of circumferential extent substantially less than an entire circumferential extent of the inner surface and wherein the first interfering portion is dimensioned to have an interfering relationship with the outer surface of the shaft that restricts radial expansion of the sleeve so that the sleeve is in tight contact with the walls defining the bores of the rotor laminations, thereby fixing the rotor laminations on the shaft.

9. The rotor of claim 8, wherein the sleeve is fabricated of fiberglass.

10. The rotor of claim 9, wherein the inner surface includes second, third and fourth interfering portions spaced from each other and spaced from the first interfering portion.

11. The rotor of claim 10, wherein the first, second, third and fourth interfering portions are equally spaced from one another and are separated by curved wall portions.

12. The rotor of claim 11, wherein the curved wall portions have a common inside radius.

13. The rotor structure of claim 12, wherein the shaft outer surface has an outer radius less than the common inside radius.

14. The rotor structure of claim 13, wherein the first, second, third and fourth interfering portions comprise flat surfaces that each face the outer surface of the rotor shaft.

* * * * *